Nov. 9, 1954
L. L. THOMPSON
2,693,945
MUD MIXER
Filed Dec. 1, 1951
3 Sheets-Sheet 1
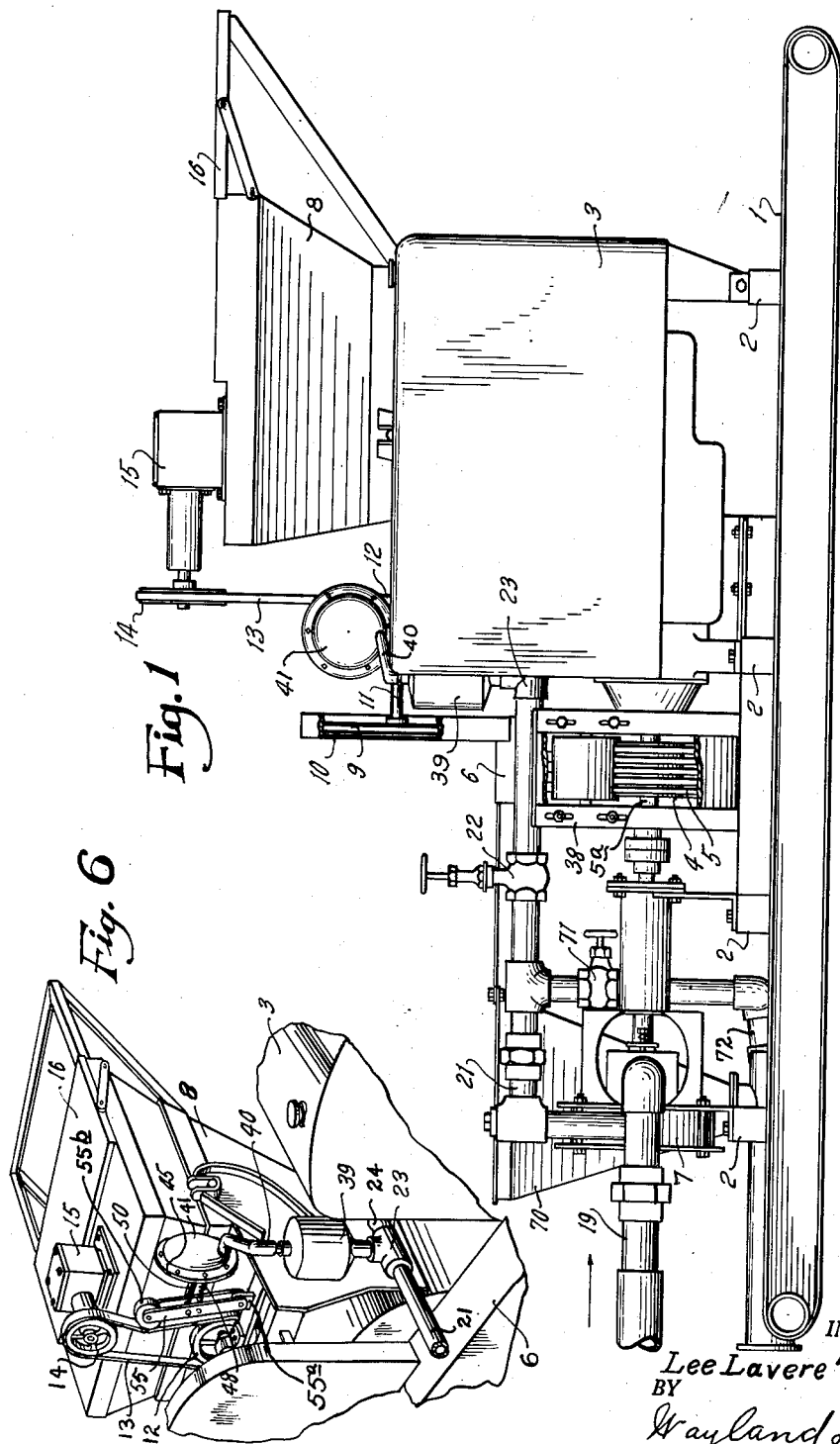
INVENTOR.
Lee Lavere Thompson
BY
Wayland D. Keith
HIS AGENT Nov. 9, 1954  L. L. THOMPSON  2,693,945
MUD MIXER
Filed Dec. 1, 1951  3 Sheets-Sheet 2
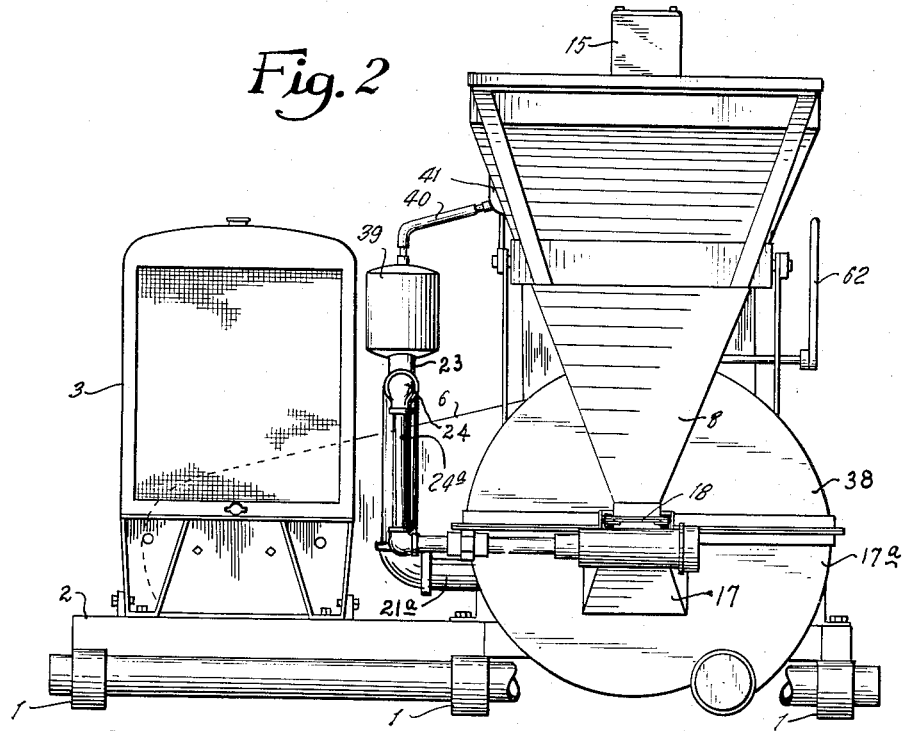
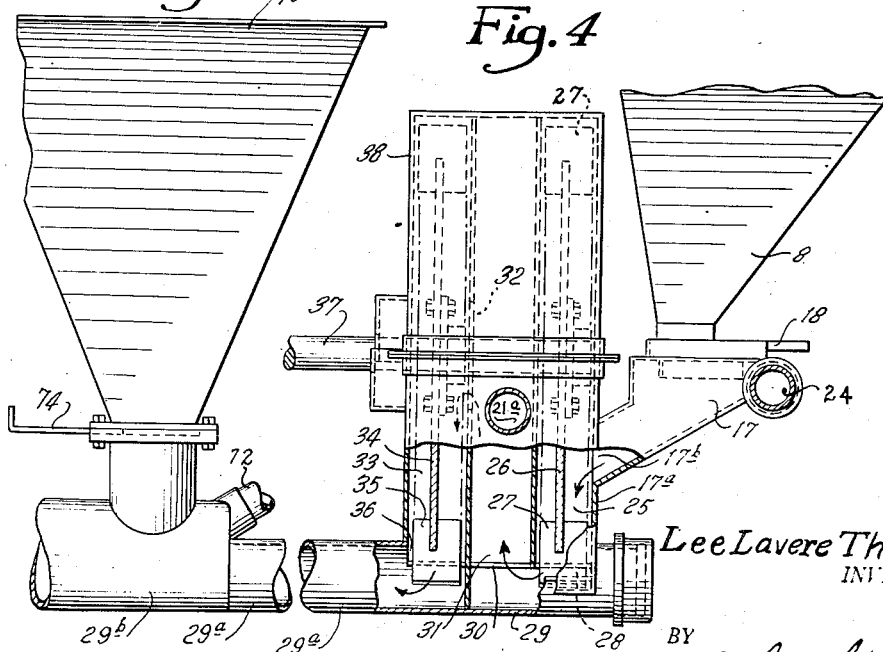
Lee Lavere Thompson
INVENTOR.
BY Wayland D. Keith
HIS AGENT Nov. 9, 1954    L. L. THOMPSON    2,693,945
MUD MIXER Filed Dec. 1, 1951    3 Sheets-Sheet 3

Lee Lavere Thompson
INVENTOR.

BY Wayland D. Keith
HIS AGENT

United States Patent Office

2,693,945
Patented Nov. 9, 1954

2,693,945

MUD MIXER

Lee Lavere Thompson, Iowa Park, Tex.

Application December 1, 1951, Serial No. 259,337

6 Claims. (Cl. 259—10)

This invention relates to improvements in mud mixers and more particularly to mud mixers of the general character as set forth in my application Ser. No. 67,689, Mud and Chemical Mixers, filed December 28, 1948, now Patent No. 2,585,701, dated Feb. 12, 1952.

The present invention is designed primarily for use with muds, betonite clays and "filling solids" such as cotton seed hulls, sawdust, and the like.

Various mixers have been proposed heretofore, but these, for the most part, were either bulky and cumbersome to handle, or if comparatively small in size and portable, they lacked the characteristic of being able to thoroughly and adequately mix the "muds" and solids with the drilling fluid sufficiently fast to enable the treated drilling fluid to be directed into a receiver for immediate use in a well.

An object of this invention is to provide a mud mixing device that will thoroughly and expeditiously mix the muds and solids with drilling fluid while the drilling fluid mixture is being directed into the slush pit at a point adjacent the suction pipe of the slush pump for immediate use in the bore hole of a well, with a rotary drilling apparatus.

Another object of this invention is to provide a mud mixer wherein the mud is mixed and re-mixed in a single continuous operation before it is discharged into a fluid conduit leading to a point in the slush pit or storage reservoir near the inlet of the suction pipe of the slush pump.

Still another object of the invention is to provide a mud mixing apparatus that is light in weight, compact in construction and easy and inexpensive to use.

An embodiment of this invention, together with a modification thereof, is illustrated in the accompanying drawing, in which:

Fig. 1 is a side elevational view of the device embodying the invention;

Fig. 2 is an end elevational view thereof;

Fig. 3 is a fragmentary detail view of the hopper used for feeding filling solids into the drilling fluid line;

Fig. 4 is an elevational view of the mud mixer with parts broken away and shown in section, and showing a fragmentary portion of the hopper connected thereto that is used for feeding dry mud or finely comminuted bentonite type clays into the mud mixer and subsequently into the drilling fluid receiver; with the arrows showing the path that the clays and a portion of the drilling fluid follows;

Fig. 6 is a fragmentary perspective view, taken from the front and a side, showing the pressure actuated control mechanism for the agitator.

Figure 5:
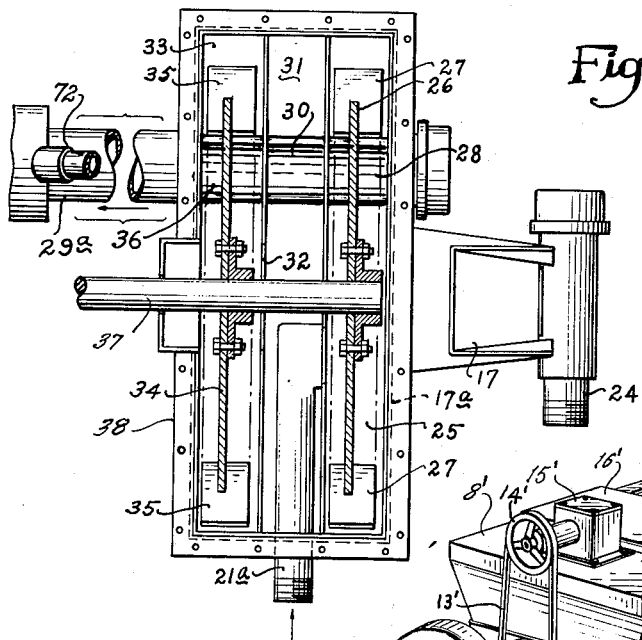
Fig. 5 is a horizontal sectional view through the primary mud mixer with the cover portion removed and showing, in section, the discs on which the beater paddles are mounted.

With more detailed reference to the drawing, the numeral 1 designates a frame forming skid sills, in the present instance they are three in number. Transverse members 2 are positioned across the skid sills 1 for mounting the component parts of the mud mixer mechanism thereon. A power plant 3 is mounted on the transverse sills and drives a belt pulley 4, mounted on a shaft 5a, to operate belts 5 leading to pulleys mounted on shaft 37 within belt casing 6 that drives a centrifugal pump 7 and a vibrator mechanism (not shown) within hopper 8. It is preferable to have a pulley that is located within belt housing 6 to drive through belt 9 through pulley 10, thence through shaft 11 through pulley 12, belt 13 and pulley 14 to drive the gearing within gear case 15 to operate a vibrator mechanism (not shown) in the hopper 8, which mechanism is similar to the vibrator mechanism shown in the drawings of the above mentioned prior application now Patent 2,585,701.

Figure 7:
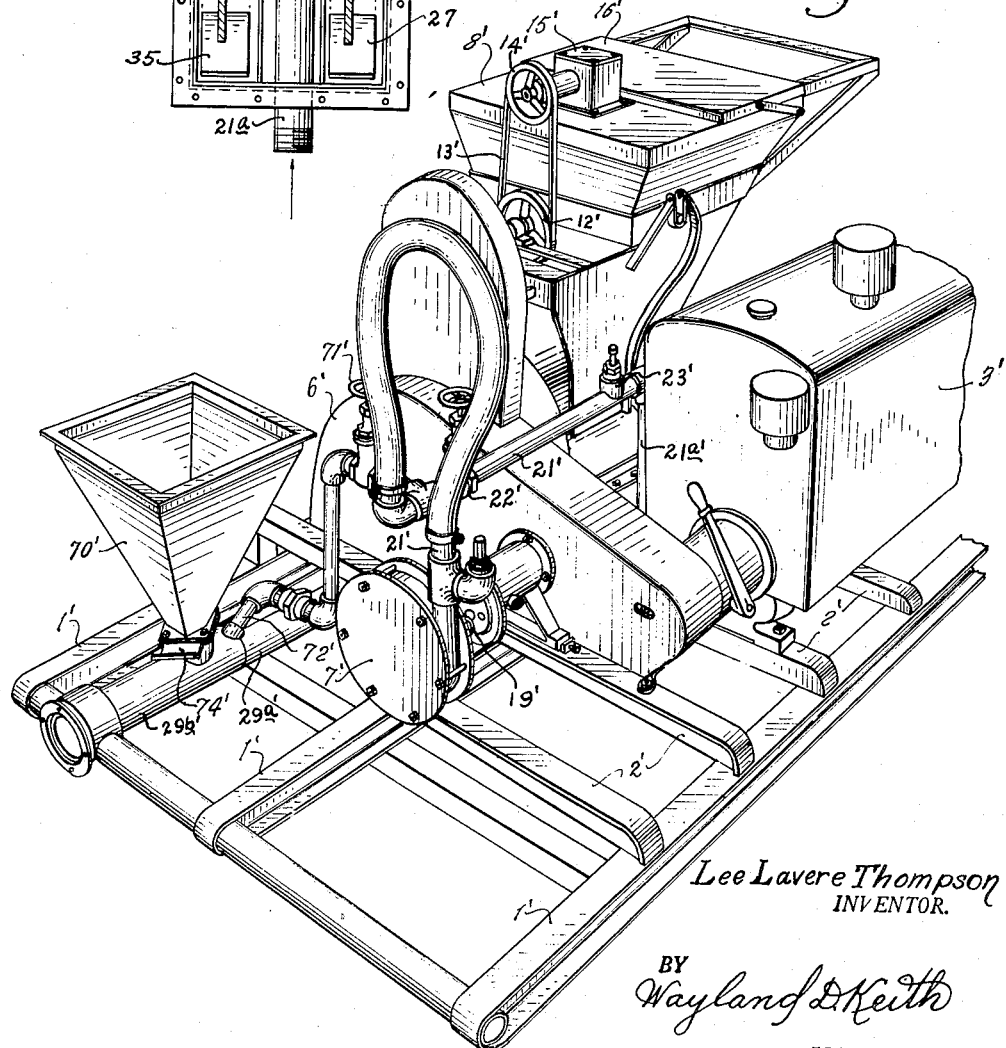
Fig. 7 is a perspective view taken from the front and a side of a slightly modified form of the invention that is substantially like the form shown in Figs. 1 through 6, except that it does not have the pressure actuated control mechanism.

The hopper 8 has a cover 16 which forms a supporting shelf, when in the position as shown in Fig. 1, for the sacks of mud, and which shelf swings into the position to cover the opening in the upper end of the hopper, when swung into the position as shown in Fig. 7.

The hopper 8 has its lower end mounted above the chute 17 into which the "dry mud" or bentonite clays are discharged. The rate of discharge is controlled by a manually operated slide valve 18 which is adapted to regulate the effective open area of the discharge end of the hopper or to close the opening therein. The chute 17 connects with a side of housing 17a at a point spaced inward from the outer periphery thereof. Drilling mud, that is to be initially treated, is directed through inlet pipe 19 into and through centrifugal pump 7 into pipe 21, one end of which pipe 21 leads through control valve 22, through T-member 23 and pipe 24 into the upper end of chute 17 where incoming drilling fluid will discharge along the entire width of chute 17 so as to carry all drilling mud or finely comminuted clays through opening 17b into the mixing chamber 25 where the finely comminuted clay and the drilling fluid is mixed into a homogenous mass of rather a thick consistency, but which is sufficiently thin to flow in the manner of a liquid. The greater portion of the drilling fluid passing through pipe 21 is directed into pipe 21a and thence into chamber 25, an will best be seen in Fig. 5, so as to be intermixed with the drilling fluid from hopper 17 carrying the finely comminuted clays.

The chamber 25 is somewhat of the character of a centrifugal pump chamber and has a disc member 26 positioned therein and which disc member has circumferentially spaced paddles 27 secured thereto so as to direct the homogenous mass outward through opening 28 into pipe 29, which pipe 29 has an opening 30 therein interconnected with a chamber 31, which allows the homogenous mass to flow upward and through axial opening 32 into a second chamber 33, which is similar to the chamber 25, and in axial alignment therewith. The chamber 33 has a disc 34 therein which disc has circumferentially spaced paddles 35 around the periphery thereof so as to perform a further beating action or mixing of the drilling fluid and the finely comminuted clay, after which the homogenous mass is directed through opening 36 which leads out through pipe 29a, to a point in the slush pit adjacent the suction pipe of the mud pump. The discs 26 and 34 are mounted upon the shaft 37 and are driven in unitary relation by some of the drive belts 5 within the housing 6, which drive belts drive a pulley mounted on shaft 37.

The housing which encloses the elements 26—27 and 34—35, is formed in two parts, an upper portion 38 and a lower portion 17a, which housing is split along a horizontal medial line, as shown in Figs. 4 and 5, to enable the removal of the mixing elements 26—27 and 34—35 which are mounted on shaft 37, as a unit.

A housing forming a chamber 39 is connected to the upper end of pipe T-member 23, which chamber 39 has a pipe outlet 40 that connects to one side of a pressure responsive diaphragm chamber 41 which has a diaphragm 45 mounted therein. The diaphragm 45 may be preloaded by a spring 48. The side of the diaphragm opposite the pipe 40 has a connecting rod 50 that is connected at one end with the diaphragm 45. The opposite end of the connecting rod 50 is pivotally connected to a pair of levers 55 at a pivot intermediate the length thereof, and which levers 55 are pivoted at their lower ends to a lug 55a. An idler pulley 55b is journalled between the levers 55 for engagement with the outer face of belt 13 so as to drive gearing within housing 15 that operates a vibrator within the hopper 8.

The belt 13 is tightened when pressure is applied to the diaphragm 45 and connecting rod 50, which belt 13 forms a driving connection between pulleys 12 and 14 when it is tight, but, when the pressure is relieved from the diaphragm 45, the belt 13 is loosened which permits rotation of pulley 12 without the pulley 14 being rotated, thereby rendering the vibrator within hopper 8 inoperative. The pulley 12 is driven by the power unit 3.

While there is pressure on diaphragm 45 as result of mud being forced through pipe 19, the vibrator within the hopper 8 will feed the finely comminuted clay, in a predetermined proportion, into chute 17 for intermixing with the drilling fluid within the primary and secondary mud mixing compartments.

However, when the drilling fluid or mud stops flowing through pipe 21a, chute 17 and mud mixing chamber 25 and the pressure is released from the diaphragm 45, the vibrator will cease to feed comminuted clay, thereby preventing clogging of the mechanism or an unproportionate mixture to be fed into the drilling fluid, which will prevent the choking or clogging of chute 17, chamber 25, and chamber 33.

The pipe 24 is reduced at 24a so as to cause a back pressure on chamber 39 when the mud is being pumped through this pipe. The chamber 29 provides an air block or ram between the mud and the diaphragm 45 in the diaphragm chamber 41.

A manually operated clutch lever 62 is also provided so that the gearing which operates the agitator within the hopper 8 may be disengaged at will.

When it is desired to introduce bulk filling material such as cotton seed hulls, sawdust, asbestos fibre and the like into the drilling fluid that is being directed into the well, the hopper 70 is filled with the material to be introduced and, if desired to use such material in conjunction with the finely comminuted clays, the valve 71 is opened to allow drilling fluid, under pressure, to enter pipe 72, which pipe is disposed at an angle at the juncture of the opening spout of hopper 70 and pipe line 29b. This will cause a turbulence which will draw the material through valve 74 into pipe line 29b and direct it out therethrough into the slush pit adjacent the pump inlet line, and thence through the mud pump into the well. However, if it is desired to use the filling material from the hopper 70, exclusive of the finely comminuted clays, the valve 22 is closed, which will direct all of the mud from the pump 7 into pipe 72. The flow of bulk material may be regulated by a manually operated slide valve 74 which is located in the bottom of hopper 70. This valve 74 may be closed when not in use, so as to prevent drilling fluid from flowing into the hopper 70, if the pipe 29b should become clogged.

The modified form of the invention, as shown in perspective in Fig. 7, is similar in construction to the form shown in Figs. 1 through 6 and described above, and bears like reference numerals to designate like parts, except that the numerals have been primed on the modified form of the device. This form of the invention, does not have the diaphragm controlled agitator mechanism for the hopper, otherwise the two forms of the invention as substantially the same.

It is to be understood, that while the device has been described in some detail in the forms illustrated, that minor changes may be made in the details of construction and adaptations made to different installations, without departing from the spirit of the invention as claimed.

Having thus described the invention, what is claimed is:

1. A mud mixer for well drilling mud comprising a pair of cylindrical housings, means for directing drilling fluid and dry comminuted material into the central portion of a first of said housings, a drive shaft journalled in said housings, a circular beater element mounted on said shaft and positioned in and coaxial with said housing for agitating said drilling fluid and said dry material, means for discharging said drilling fluid and mud mixed therewith out of the outer periphery of said first housing into the central portion of the other of said housings, a second circular beater means mounted on said drive shaft and positioned in and coaxial with said second housing to further agitate said mixture, and an outlet formed in said housing for discharging said mixture from the outer periphery of said second housing into a receiver for use in a well.

2. A mud mixer for well drilling mud comprising a pair of cylindrical housings, means for directing a portion of said drilling fluid and dry material through one side of the central portion of one of said housings and drilling fluid into the central portion of said housing through the other side thereof, a drive shaft journalled in said housing, circular agitating means mounted on said shaft for agitating said drilling fluid and said dry material positioned in and coaxial with said housing, a peripherial discharge opening formed in said first housing to discharge said mixture from said first housing into the inner portion of the other of said housings, a second circular agitating means mounted on said drive shaft and positioned in and coaxial with said second housing for further agitating said mixture and for discharging said mixture from a peripherical discharge opening formed in said second housing into a receiver for use in a well.

3. A mud mixer for well drilling mud comprising a base, a power unit mounted on said base, a pump having an inlet opening and an outlet opening formed therein, said pump being mounted on said base and connected to said power unit in driven relation, a mud agitator comprising a pair of housings mounted on said base, each of said housings having a chamber formed therein, each of said housings having an agitator element mounted therein, means connecting said power unit with said agitator elements in said chambers for agitating a mixture therein, one of said housings having a feed chute connected thereto near the axis thereof and projecting outward from a side thereof, a hopper mounted above said chute for feeding dry, comminuted material into said feed chute, mechanism connected with said power unit and said hopper for agitating said dry, comminuted material, means for discharging drilling fluid and dry comminuted material from the outer portion of said first mentioned chamber into the inner portion of the second of said chambers, means for discharging said mixture from the outer periphery of said second chamber into a receiver for use in a well, and pressure actuated means for disengaging said mechanism of said hopper from said power unit upon decrease of said mud pressure to said mud agitator below a predetermined setting.

4. A mud mixer for well drilling mud comprising a base, a power unit mounted on said base, a pump, having an inlet and an outlet, mounted on said base and connected to said power unit in driven relation, a mud agitator comprising a pair of housings mounted on said base, each of which housings forms a chamber, each of said chambers having an agitator element mounted therein, means connecting said power unit with said agitator elements in the respective housings for agitating a mixture therein, one of said housings having a feed chute connected thereto near the axis thereof which projects outward from a side of said housing, a hopper mounted above said chute for feeding dry, comminuted material into said feed chute, a mechanism connected with said power unit and said hopper for agitating said dry, comminuted material, means for discharging drilling fluid and dry, comminuted material from the outer portion of said first mentioned chamber into the inner portion of said second chamber, means for discharging said mixture from the outer periphery of the second of said chambers into a receiver for use in a well, and means for disengaging said mechanism of said hopper from said power unit upon decrease of mud pressure to said mud agitator below a predetermined setting.

5. A mud mixer for well drilling mud comprising a base, a power unit mounted on said base, a pump mounted on said base and connected to said power unit in driven relation, an agitator housing having a pair of chambers formed therein which housing is mounted on said base, said mud agitator housing having a flat bottom feed chute projecting from a side thereof and connecting with one chamber of said mud agitator housing at a point spaced inward from the outer periphery thereof, said agitator housing having an agitator mounted therein, a hopper mounted above said chute for feeding dry, comminuted material thereinto, a fluid conduit connected with said chute for directing drilling fluid thereinto, a second fluid conduit for directing drilling fluid into said chamber near the axis thereof, an outlet formed in the outer periphery of said housing and in communication with said chamber for directing the mixture formed therein outward therefrom and into a passage leading to an axial inlet opening formed in a second chamber of said mud agitator housing, a discharge outlet formed in the outer periphery of said mud agitator housing and in communication with the second of said chambers for directing said mixture into a receiver for use in a well.

6. In a mud mixer a housing having a mixing chamber formed therein a fluid pump, said housing also having an inlet opening and an outlet opening formed therein with the outlet of said pump being connected with the inlet of said mixing chamber, an agitator within said mixing chamber for mixing drilling fluid and a finely comminuted, dry material, a hopper for feeding said dry, finely comminuted material into said mixing chamber in a predetermined amount, a pipe connected to said mixing chamber housing and in communication with said outlet for directing material therefrom, a second hopper mounted on said base, which hopper is adapted to contain the coarse, dry material to be fed into said pipe, a further conduit connected at approximately a forty five degree angle to said pipe adjacent the discharge end of said second hopper for discharging said mixture from said mixing chamber into said pipe so as to cause a turbulence for mixing said coarse dry material with said mixture for use in a well, and power means for driving said pump and for driving said agitator.

References Cited in the file of this patent

UNITED STATES PATENTS

| Number | Name | Date |
|---|---|---|
| 765,975 | Hooley | July 26, 1904 |
| 1,760,906 | Johnson | June 3, 1930 |
| 1,829,066 | Shelton | Oct. 27, 1931 |
| 1,983,319 | Simpson | Dec. 4, 1934 |
| 2,022,205 | Kramer | Nov. 27, 1935 |
| 2,053,876 | Pfau et al. | Sept. 8, 1936 |
| 2,164,257 | Riza | June 27, 1939 |
| 2,213,056 | Skoog et al. | Aug. 27, 1940 |
| 2,283,487 | Boileau | May 19, 1942 |
| 2,447,202 | Nowery | Aug. 17, 1948 |
| 2,569,439 | Blake | Oct. 2, 1951 |